United States Patent [19]

Glore

[11] 4,356,851
[45] Nov. 2, 1982

[54] JOINTER-PLANER FENCE MOUNTING
[75] Inventor: Thomas G. Glore, Easley, S.C.
[73] Assignee: The Singer Company, Stamford, Conn.
[21] Appl. No.: 211,489
[22] Filed: Dec. 1, 1980
[51] Int. Cl.³ ............................ B27C 1/14; B27C 1/12
[52] U.S. Cl. .................................................. 144/253 G
[58] Field of Search ........... 144/253 R, 253 G, 117 R, 144/128, 131, 2 R; 83/467, 468

[56] References Cited

U.S. PATENT DOCUMENTS

| | | | |
|---|---|---|---|
| 2,049,044 | 7/1936 | Boice | 144/253 G |
| 2,140,322 | 12/1938 | Lonskey | 144/253 G |
| 2,581,475 | 1/1952 | Fenner | 144/253 G |
| 2,592,384 | 4/1952 | Boice | 144/253 G |
| 2,619,997 | 12/1952 | Gaskell | 144/253 G |

*Primary Examiner*—W. D. Bray
*Attorney, Agent, or Firm*—Robert E. Smith; Edward L. Bell

[57] ABSTRACT

A jointer-planer is fabricated of a single generally U-shaped die-casting of integral one-piece construction extending generally the full length and breadth of the machine and to which each of the other major components are directly attached having a base section defining the out-feed table and two parallel, spaced apart side edge leg portions extending past the cutter assembly and on opposite sides of the in-feed table so that the in-feed table is disposed between the elongated side edge leg portions. One of the elongated side edge leg portions is provided with a pair of longitudinally spaced apart fence mounting bracket portions of integral, one-piece construction therewith having generally arcuate outer surfaces providing a virtual pivot axis about which a molded longitudinally extensive elongated fence of integral, one-piece construction is positioned. A pair of locking screws hold the fence to the mounting bracket while a guard for the cutter assembly is pivotally mounted to the other of the elongated side portions of the out-feed table casting. The motor, cutter assembly, in-feed table assembly, and base are each directly also mounted to the U-shaped die-casting.

13 Claims, 2 Drawing Figures

JOINTER-PLANER FENCE MOUNTING

FIELD OF THE INVENTION

This invention relates to jointer-planers for use in edging and surface planing materials such as wood, or the like, and, more particularly, to improve fences and fence mountings therefor.

BACKGROUND OF THE INVENTION

A jointer-planer is a bench or table mounted power tool which can be utilized to smooth rough stock, chamfer decorative edges, square edges on wood stock and joint edges for a tight flush fit, as in laminating boards edge-to-edge for fabricating furniture tops, doors, sides, panels, shelves, and the like. To achieve these functions, the machine generally comprises an elongated generally cylindrical cutter assembly or head that rotates about a generally horizontal axis and having one or more, generally a plurality, of peripherally mounted generally linear cutting knives together with an in-feed table adjustable parallel the cutter head axis for supporting the board or other work piece for feed to the cutter head, and an out-feed table for receiving the board after it has passed the cutter head and had its surface planed thereby. A fence which passes perpendicular the cutter head axis, extending along the edges of the in-feed and out-feed tables, is generally also provided which is adjustable rotatably about a horizontal axis to enable the planed surface to be finished perpendicular another surface or at a desired angle relative thereto. These components are carried by a base assembly which provides rigidity and stability to the tool and carries a drive means for rotating the cutter head at high speed. The present application relates to the fence and fence mounting which enables such fence and mounting to be provided extremely economicly comprising few parts, easily assembled but yet adapted to be easily adjusted and locked in a desired angular orientation to enable the machine to function smoothly, easily, and accurately.

OBJECTS OF THE INVENTION

Bearing in mind the foregoing, it is a primary object of the present invention to provide a novel and improved jointer-planer, fence, and fence mounting therefor which is inexpensive to produce and assemble and which is yet accurate and easy to adjust.

Another primary object of the present invention, in addition to the foregoing object, is the provision of an improved jointer-planer, fence, and fence mounting therefor which comprises a minimal number of components.

Another primary object of the present invention, in addition to each of the foregoing objects, is the provision of a novel fence for a jointer-planer which is of integral one-piece construction and fabricated of structural plastic.

Still another primary object of the present invention, in addition to each of the foregoing objects, is the provision of an improved jointer-planer wherein the out-feed table is a portion of a die-casting of integral one-piece construction including both a side edge portion extending longitudinally past the out-feed table portion, the cutter assembly, and the in-feed table; and a plurality of fence mounting portions providing a virtual pivot axis for the fence.

Yet still another primary object of the present invention, in addition to each of the foregoing objects, is the provision of such a jointer-planer having a generally flat, U-shaped die-casting of integral one-piece construction including the out-feed table, extending substantially the full width and length of the machine to which each of the other major components, including the motor, cutter assembly, in-feed table assembly, base, and fence are directly attached, whereby the die-casting comprises the major structural support member therefore.

The invention resides in the combination, construction, arrangement and disposition of the various component parts and elements incorporated in improved jointer-planers, fences, and fence mounting therefor in accordance with the principles of this invention. The present invention will be better understood and objects and important features other than those specifically enumerated above will become apparent when consideration is given to the following details and description which, when taken in conjunction with the annexed drawing, describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

A jointer-planer is fabricated of a single generally U-shaped die-casting of integral one-piece construction extending generally the full length and breadth of the machine and to which each of the other major components are directly attached having a base section defining the out-feed table and two parallel, spaced apart side edge leg portions extending past the cutter assembly and on opposite sides of the in-feed table so that the in-feed table is disposed between the elongated side edge leg portions. One of the elongated side edge leg portions is provided with a pair of longitudinally spaced apart fence mounting bracket portions of integral, one-piece construction therewith having generally arcuate outer surfaces providing a virtual pivot axis about which a molded longitudinally extensive elongated fence of integral, one-piece construction is positioned. A pair of locking screws hold the fence to the mounting bracket while a guard for the cutter assembly is pivotally mounted to the other of the elongated side portions of the out-feed table casting. The motor, cutter assembly, in-feed table assembly, and base are each directly also mounted to the U-shaped die-casting.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

DETAILED DESCRIPTION OF THE INVENTION

Figure 1:
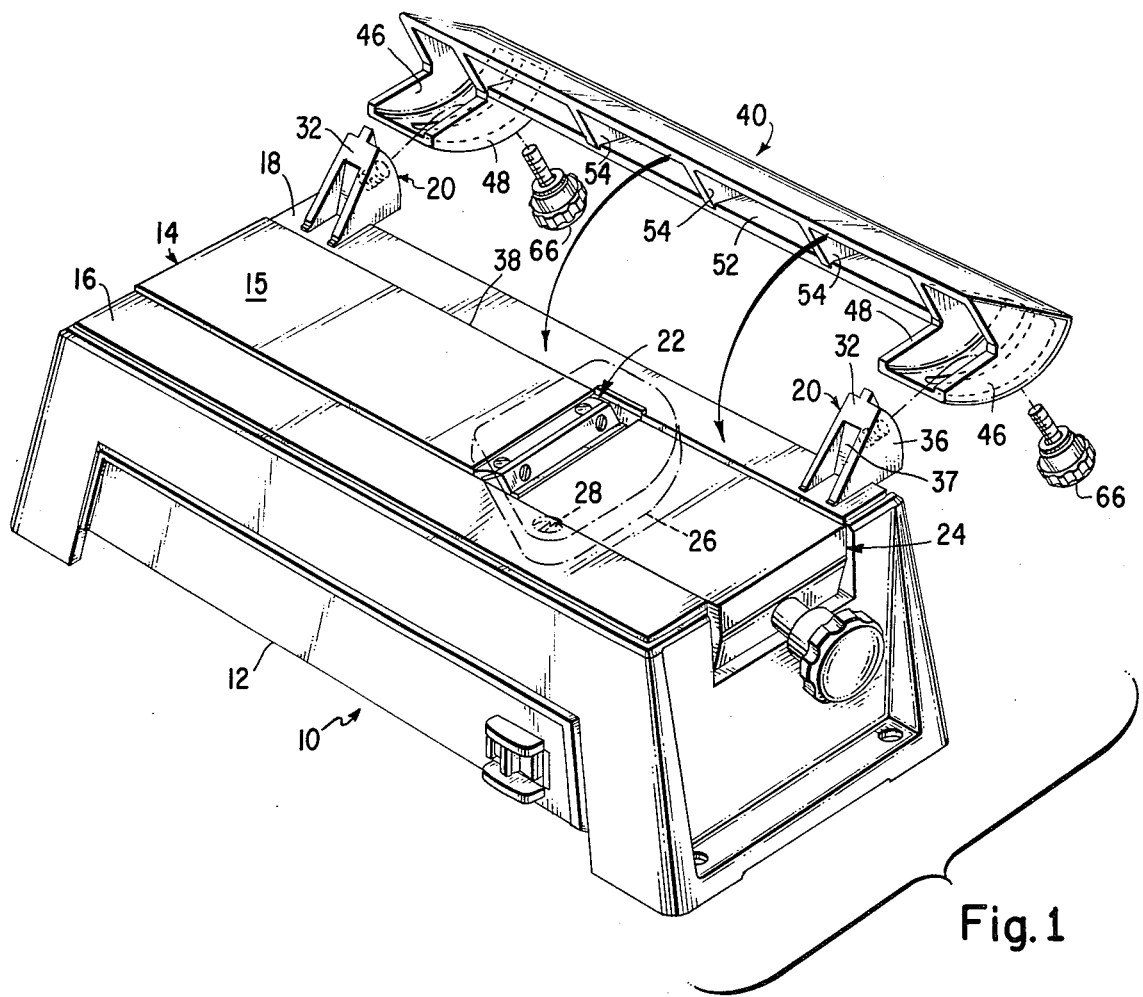
FIG. 1 is an isometric illustration, partially exploded, of a jointer-planer in accordance with the present invention.

With reference now to the drawing, there is shown and illustrated a jointer-planer constructed in accordance with the principles of the present invention designated generally by the reference character 10 which comprises a generally rectangular hollow base 12 fabricated, for example, of molded structural plastic and carrying, on the top surface thereof, a generally U-shaped die-casting 14 of integral one-piece construction including a base portion defining an out-feed table 15 and a pair of elongated side edge leg portions 16 and 18 together with a pair of fence mounting support bracket portions 20 longitudinally spaced apart therealong on the side portion 18. The out-feed table portion 15 is generally raised above the plane of the side portions 16 and 18 so as to be easily grindable or machinable to a true, flat surface. Mounted within the base portion 12 and generally suspended from the die-casting 14, there may be provided a drive motor (not shown) connected with a cutter assembly 22 positioned generally between and beneath the side edge leg portions 16 and 18 forwardly of the out-feed table portion 15. Also suspended from the die-casting 14 is an in-feed table assembly 24 more particularly shown and described in my copending application Ser. No. 204,406 executed by me Oct. 28, 1980, filed Nov. 6, 1980, assigned to the assignee of the instant application, and incorporated herein by reference as fully and completely as if reproduced hereat. Further, a blade guard 26 may be pivotally mounted with the side edge leg portion 16, as by a screw 28.

The fence mounting portions 20 which, as heretofore pointed out, are of integral, one-piece construction with the side edge leg portion 18 are of generally segmental configuration comprising an arcuate outer wall 30, a top wall 32 and a pair of generally spaced apart side walls 36 delineated by the top wall 32, the arcuate wall 30 and a bottom edge 34 extending generally horizontally outwardly of the side edge leg 18 so that, in horizontal cross-section fence mounting portions 20 are of generally U-shaped configuration. An intermediate wall 37 extends between the side walls 36 producing rigidity and stability with minimal usage of material.

The arcuate outer edge surfaces of arcuate walls 30 are preferably semi-cylindrical configuration having a center of rotation generally at, or very closely adjacent, the edge 38 of the in-feed table portion 15 adjacent the side edge leg portion 18 so as to define a virtual pivot thereat for a fence 40 to be carried thereby. The fence 40 is also of integral, one-piece construction and may be molded, for example, of structural plastic similar to the base 12. The fence 40 comprises a front or guiding wall 42 of generally rectangular configuration and a rear wall 44 of generally arcuate configuration subtending an arc of approximately 90° extending rearwardly from the upper edge of the front wall 42. Segmental end walls 46 are provided extending between the front wall 42 and the rear wall 44 at either end of the fence 40 disposed to be positioned outward of the fence mounting portions 20 when the fence 40 is assembled therewith.

Further, the fence 40 comprises a pair of segmental inner walls 48 extending generally parallel and spaced apart from the outer end walls 46 also between the front wall 42 and rear wall 44 and adapted to be disposed inward of the fence mounting portions 20 so that at each end of the fence a segmental chamber is defined within which the respective ones of the fence mounting portions 20 extend. Each of the walls 46 and 48 is provided with a notch 50 of generally right angle configuration to provide clearance for the side edge portion 18 of the die-casting 14 and the base 12 while enabling the fence 40 to be pivoted around the fence mounting portions 20. The arcuate wall 30 of the fence mounting portion 20, the arcuate rear wall 44 of the fence 40 are congruant to enable the fence 40 to be pivoted around the virtual pivot defined thereby.

Between the inner walls 48, the arcuate rear wall 44 is notched and there is further provided an intermediate wall 52 extending generally parallel the front wall 42. Extending between the intermediate wall 52 and the front wall 42 there is also provided a plurality of reenforcing rib walls 54 thereby providing a lightweight but rigid construction to the fence 40.

Figure 2:
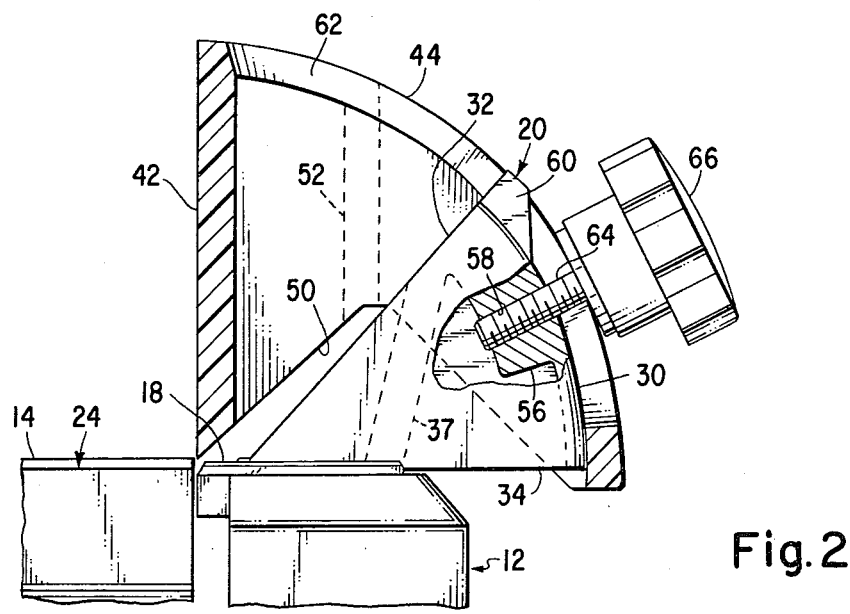
FIG. 2 is an enlarged cross-sectional elevational partial view of the jointer-planer through the righthand one of the fence mounting bracket portions.

The fence mounting portions 20 further comprise a generally arcuate boss 56 extending inwardly from the arcuate wall 30 provided with a threaded aperture 58 extending inwardly perpendicular the rear wall 30. Above the threaded aperture 58, the fence support portions 20 still further each comprise a tang or tab 60. The rear arcuate wall 44 of the fence 40 is provided with a pair of arcuate slots 62, one between each pair of inner and outer walls 46 and 48 and in alignment with the respective tang or tab 60 and threaded aperture 58 so that the tang or tab 60 may be engaged within the arcuate slot 62 to guide the fence 40 on the fence support portions 20. A locking screw 64 which may, as shown, be provided with an enlarged finger grip head 66 is engaged with each of the threaded apertures 58 extending through the arcuate slot 62 to enable the fence to be locked in position. As is apparent from FIG. 2, the fence may be thereby positioned with the front wall 42 thereof perpendicular the in-feed and out-feed tables 24 and 14, may be dropped rearwardly therefrom preferably generally at least about 45° and tilted forwardly preferably at least about 10° to enable the jointer-planer to be utilized for jointing, planing, chamfering, and the like.

While the invention has been described, disclosed, illustrated and shown in terms of certain embodiments or modifications herein described, disclosed, illustrated or shown, such other embodiments or modifications as may be suggested to those having the benefit of the teachings herein are intended to be reserved, especially as they fall within the scope and breadth of the claims hereto appended.

I claim:

1. Jointer-planer comprising a single generally U-shaped die-casting of integral one-piece construction extending generally the full length and breadth of the machine having a base section defining an out-feed table and two parallel, spaced apart side edge leg portions extending past a cutter assembly and on opposite sides of an in-feed table so that the in-feed table is disposed between the elongated side edge leg portions, one of said elongated side edge leg portions being provided with a pair of longitudinally spaced apart fence mounting bracket portions of integral, one-piece construction therewith having generally arcuate outer surfaces providing a virtual pivot axis about which a molded longitudinally extensive elongated fence of integral, one-piece construction is positioned.

2. Jointer-planer defined in claim 1 further comprising a generally rectangular hollow base fabricated, for example, of molded structural plastic beneath said generally U-shaped die-casting of integral one-piece construction, said fence mounting bracket portions being of generally segmental configuration comprising an arcuate outer wall, a top wall and a pair of generally spaced apart side walls delineated by the top wall.

3. Jointer-planer defined in claim 2 wherein the arcuate outer edge surfaces of arcuate walls are of semi-cylindrical configuration having a center of rotation generally at, or very closely adjacent, the edge of the in-feed table portion so as to define a virtual pivot thereat for the fence carried thereby.

4. Jointer-planer defined in claim 3 wherein the fence is also of integral, one-piece construction and molded, for example, of structural plastic, comprising a front or guiding wall of generally rectangular configuration and a rear wall of generally arcuate configuration subtending an arc of approximately 90° extending rearwardly from the upper edge of the front wall.

5. Jointer-planer defined in claim 4 wherein said fence further comprises segmental end walls provided extending between said front wall and said rear wall at either end of the fence disposed outward of said fence mounting bracket portions and a pair of segmental inner walls extending generally parallel and spaced apart from said outer end walls also between the front wall and rear wall and disposed inward of said fence mounting bracket portions so that at each end of the fence a segmental chamber is defined within which the respective ones of the fence mounting bracket portions extend.

6. Jointer-planer defined in claim 5 each of said inner and outer walls is provided with a notch of generally right angle configuration to provide clearance for said side edge leg portion and said base while enabling said fence to be pivoted around said fence mounting bracket portions.

7. Jointer-planer defined in claim 6 wherein said arcuate wall of said fence mounting bracket portions and said arcuate rear wall of said fence are congruant to enable said fence to be pivoted around the virtual pivot defined thereby.

8. In a jointer-planer having a single generally U-shaped die-casting of integral one-piece construction extending generally the full length and breadth of the machine having a base section defining an out-feed table and two parallel, spaced apart side edge leg portions extending past a cutter assembly and on opposite sides of an in-feed table so that the in-feed table is disposed between the elongated side edge leg portions; a pair of longitudinally spaced apart fence mounting bracket portions of integral, one-piece consrtuction therewith provided on one of said elongated side edge leg portions having generally arcuate outer surfaces providing a virtual pivot axis about which a molded longitudinally extensive elongated fence of integral, one-piece construction is positioned.

9. In a jointer-planer as defined in claim 8 wherein said fence mounting bracket portions being of generally segmental configuration comprising an arcuate outer wall, a top wall and a pair of generally spaced apart side walls delineated by the top wall.

10. In a jointer-planer as defined in claim 9 wherein the arcuate outer edge surfaces of arcuate walls are of semi-cylindrical configuration having a center of rotation generally at, or very closely adjacent, the edge of the in-feed table portion so as to define a virtual pivot thereat for the fence carried thereby.

11. In a jointer-planer as defined in claim 10 a fence also of integral, one-piece construction and molded, for example, of structural plastic, comprising a front or guiding wall of generally rectangular configuration and a rear wall of generally arcuate configuration subtending an arc of approximately 90° extending rearwardly from the upper edge of the front wall.

12. In a jointer-planer as defined in claim 4, said fence further comprising segmental end walls provided extending between said front wall and said rear wall at either end of the fence disposed outward of said fence mounting bracket portions and a pair of segmental inner walls extending generally parallel and spaced apart from said outer end walls also between the front wall and rear wall and disposed inward of said fence mounting bracket portions so that at each end of the fence a segmental chamber is defined within which the respective ones of the fence mounting bracket portions extend.

13. In a jointer-planer as defined in claim 12, each of said inner and outer walls being provided with a notch of generally right angle confirugation to provide clearance for said side edge leg portion and said base while enabling said fence to be pivoted around said fence mounting bracket portions.

* * * * *